(12) United States Patent
Farre

(10) Patent No.: US 10,994,345 B2
(45) Date of Patent: May 4, 2021

(54) DRILLING AID SYSTEM

(71) Applicant: Airbus Operations SAS, Toulouse (FR)

(72) Inventor: Eric Farre, Colomiers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 16/778,195

(22) Filed: Jan. 31, 2020

(65) Prior Publication Data

US 2020/0246880 A1     Aug. 6, 2020

(30) Foreign Application Priority Data

Feb. 4, 2019  (FR) ...................................... 1901063

(51) Int. Cl.
    *B23B 47/26*     (2006.01)
(52) U.S. Cl.
    CPC ...... *B23B 47/26* (2013.01); *B23B 2260/0082* (2013.01)
(58) Field of Classification Search
    CPC ..... B23B 49/00; B23B 49/003; B23B 49/005; B23B 49/006; B23B 49/008; B23B 47/26; B23B 2260/0082; B23B 2260/0482; B23B 2260/136
    See application file for complete search history.

(56) References Cited

U.S. PATENT DOCUMENTS

| | | | |
|---|---|---|---|
| 2,294,303 A | 8/1942 | Jagow | |
| 2,608,114 A | 8/1952 | Martin et al. | |
| 2,905,030 A * | 9/1959 | Cogsdill | B23B 51/104 408/112 |
| 3,060,772 A * | 10/1962 | Crump | B23B 51/104 408/112 |
| 4,757,598 A * | 7/1988 | Redman | F16H 3/54 29/560 |
| 5,096,342 A * | 3/1992 | Blankenship | B23B 49/008 408/112 |
| 5,356,245 A * | 10/1994 | Hosoi | B08B 15/04 408/56 |
| 5,988,954 A * | 11/1999 | Gaskin | B23Q 11/0046 408/67 |

(Continued)

OTHER PUBLICATIONS

French Search Report; priority document.

*Primary Examiner* — Nicole N Ramos
(74) *Attorney, Agent, or Firm* — Greer, Burns & Crain, Ltd.

(57) ABSTRACT

A drilling aid system which comprises a body with a first cavity, a shaft mounted to be able to rotate within the first cavity, a slider which has a proximal end mounted to be able to move in translation within the first cavity, where the slider has a second cavity which extends the first cavity, a collar that is able to move in translation on the shaft, a first compression spring having a first stiffness and pressing against the collar and against the proximal end of the slider, and a second compression spring having a second stiffness greater than the first stiffness, and pressing against the collar and against the proximal end of the body. A system of this kind makes it possible to make the user perceive that the end of the drilling operation is nigh and that therefore the force applied to the drill should be reduced.

4 Claims, 1 Drawing Sheet

(56) References Cited

U.S. PATENT DOCUMENTS

| | | | |
|---|---|---|---|
| 6,543,971 B2 * | 4/2003 | Mawhinney | B23B 49/005 408/139 |
| 7,252,464 B2 * | 8/2007 | Goth | B23B 49/006 408/110 |
| 7,726,664 B2 * | 6/2010 | Peters | B23B 31/005 279/143 |
| 2009/0136309 A1 * | 5/2009 | Coulston | B23Q 11/0046 408/200 |
| 2017/0008094 A1 | 1/2017 | Nguyen et al. | |

* cited by examiner

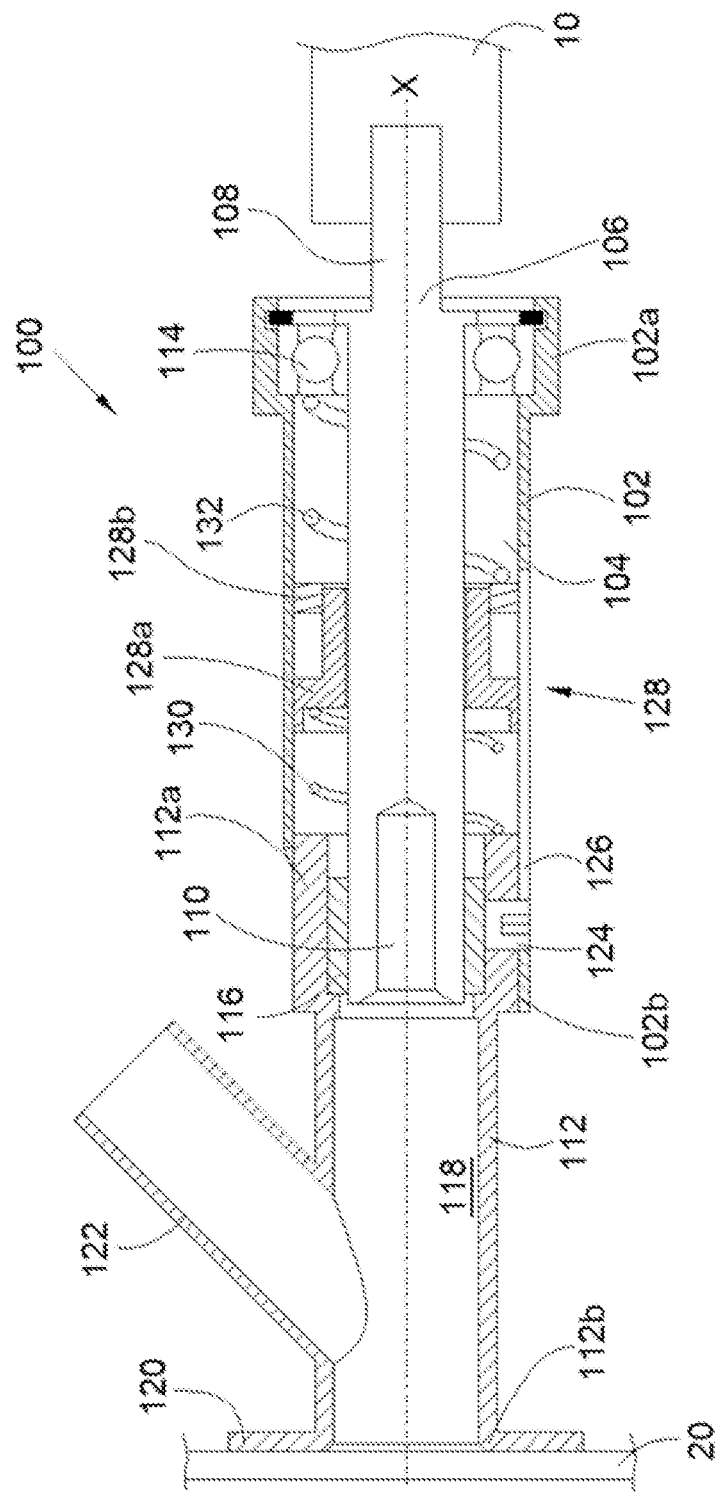

DRILLING AID SYSTEM

CROSS-REFERENCES TO RELATED APPLICATIONS

This application claims the benefit of the French patent application No. 1901063 filed on Feb. 4, 2019, the entire disclosures of which are incorporated herein by way of reference.

FIELD OF THE INVENTION

The present invention relates to a drilling aid system and to a drill equipped with such an aid system.

BACKGROUND OF THE INVENTION

It is frequently the case that a person wishes to drill through two plates laid one on the other using a drill equipped with a drill bit. In this case, the person will place the drill bit against a plate and press on the drill. It is known that the force exerted by the person must be steady and not too great so as to limit the risk of chipping of the material.

As the drill bit progresses through the first plate, the force exerted by the user and when the first plate is drilled through, the force is then transmitted to the second plate which experiences a large force which can chip its surface.

In the same way, in the case of drilling a single plate, it is desirable to avoid the force being too great when the drill bit arrives at the end of the drilling operation in order to avoid tearing the material.

It is therefore desirable to find a drilling aid system which limits the force when the plate is almost drilled through.

SUMMARY OF THE INVENTION

The present invention has an object of proposing a drilling aid system which limits the force exerted by the user at the end of the drilling operation.

To that end, the invention proposes a drilling aid system designed to be mounted on a drill and comprising:
- a body with a first cavity extending between a proximal end and a distal end of the body where the proximal end is intended to be oriented towards the drill,
- a shaft mounted so as to be able to rotate about an axis of rotation within the first cavity and having a proximal end that is intended to be secured to a chuck of the drill and a distal end to which a drill bit is secured,
- a slider which has a proximal end and a distal end which is intended to come to press against a plate that is to be drilled, where the proximal end of the slider is mounted so as to be able to move in translation parallel to the axis of rotation within the first cavity at the distal end of the body, where the slider has a second cavity which extends the first cavity and which extends between the proximal end and the distal end of the slider,
- a collar that is able to move in translation parallel to the axis of rotation on the shaft and within the first cavity,
- a first compression spring having a first stiffness and arranged in the first cavity and pressing, on one hand, against the collar and, on the other hand, against the proximal end of the slider, and
- a second compression spring having a second stiffness greater than the first stiffness, arranged in the first cavity and pressing, on one hand, against the collar and, on the other hand, against the proximal end of the body.

A system of this kind makes it possible to make the user perceive that the end of the drilling operation is nigh and that therefore the force applied to the drill should be reduced.

Advantageously, the slider has, at its distal end, a sole plate.

Advantageously, the collar is adjustable in length parallel to the axis of rotation.

Advantageously, the collar comprises two rings that are screwed to one another.

The invention also proposes a drill comprising a chuck and a drilling aid system according to one of the preceding variants, where the proximal end of the shaft is secured to the chuck and where a drill bit is secured to the distal end of the shaft and accommodated in the second cavity.

BRIEF DESCRIPTION OF THE DRAWINGS

The above-mentioned features of the invention, along with others, will become more clearly apparent on reading the following description of one exemplary embodiment, said description being given with reference to the appended drawing, in which:

The FIGURE is a view in section through an axial plane of a drilling aid system according to the invention.

DETAILED DESCRIPTION OF THE PREFERRED EMBODIMENTS

The FIGURE shows an aid system 100 mounted on a drill which is represented here by its chuck 10 that is able to move in rotation about an axis of rotation X.

The aid system 100 comprises a body 102 with a first cavity 104 and a shaft 106.

The body 102 has a proximal end 102a oriented towards the drill and a distal end 102b oriented in the opposite direction. The first cavity 104 extends between the proximal end 102a and the distal end 102b of the body 102.

The shaft 106 is mounted so as to be able to rotate about the axis of rotation X within the first cavity 104 and it has a proximal end 108 that is secured to the chuck 10 and a distal end 110 to which a drill bit is secured, In the embodiment of the invention presented here, the proximal end 102a of the body 102 corresponds generally to the proximal end 108 of the shaft 106, and the distal end 102b corresponds generally to the distal end 110 of the shaft 106.

The aid system 100 also comprises a slider 112 which has a proximal end 112a and a distal end 112b which comes to press against a plate that is to be drilled.

The proximal end 112a of the slider 112 is mounted so as to be able to move telescopically within the first cavity 104, that is to say, it is able to move in translation parallel to the axis of rotation X within the first cavity 104 at the distal end 102b of the body 102. Conversely, the body 102 is able to move in translation with respect to the slider 112.

The slider 112 also has a second cavity 118 which extends the first cavity 104 and which extends between the proximal end 112a and the distal end 112b of the slider 112.

The drill bit then passes through the second cavity 118.

The aid system 100 comprises a collar 128 that is able to move in translation parallel to the axis of rotation X on the shaft 106 and within the first cavity 104.

The aid system 100 comprises a first compression spring 130 having a first stiffness and arranged in the first cavity 104 and comes to press, on one hand, against the collar 128 and, on the other hand, against the proximal end 112a of the slider 112.

The aid system 100 comprises a second compression spring 132 having a second stiffness greater than the first stiffness. According to one particular embodiment, the first stiffness is of the order of 3 N/mm and the second stiffness is of the order of 5 N/mm.

The second compression spring 132 is arranged in the first cavity 104 and comes to press, on one hand, against the collar 128 and, on the other hand, against the proximal end 102a of the body 102, in this case by the intermediary of a proximal bearing 114.

The operation of the aid system 100 is then as follows. The distal end 112b of the slider 112 is pressed against a plate 20 that is to be drilled. The drill is switched on and the chuck 10 rotates the shaft 106 which in turn drives the drill bit. The user exerts a force on the drill towards the plate 20, which causes the body 102 to move towards the plate 20 and thus the slider 112 to slide into the first cavity 104 by compression of the first spring 130. When the first spring 130 is entirely compressed, the force exerted by the user then acts on the second spring 132, which is compressed in turn and whose stiffness is greater which allows the user to detect a variation in the resistance to the advance, and thus to understand that the drill bit has almost passed through the plate 20. The user can then ease off the pressure on the drill in order to avoid exiting the plate 20 with excessive speed, which risks tearing material off the plate 20 or chipping another plate which might be behind the plate 20.

The shaft 106 is guided in rotation by the proximal bearing 114, in this case a ball bearing, which is secured to the body 102 in the first cavity 104, and by a distal bearing 116, in this case a bearing bushing, secured to the slider 112 in the second cavity 118.

The distal bearing 116 is, in this case, positioned at the level of the distal end 110 of the shaft 106 and at the level of the proximal end 112a of the slider 112. The proximal bearing 114 is, in this case, positioned at the level of the proximal end 108 of the shaft 106 and at the level of the proximal end 102a of the body 102.

The distal bearing 116 is mounted tightly in the proximal end 112a and held by a set screw 124 which is screwed into the slider 112 and bears against the distal bearing 116. In the embodiment of the invention shown in FIG. 1, the body 102 has a slot 126 through which the head of the set screw 124 can move when the body 102 moves with respect to the slider 112. The set screw 124 also serves as an abutment for the slider 112, to avoid it being driven in rotation.

In this case, the proximal bearing 114 is secured by a shoulder of the body 102 and a circlip.

In the embodiment of the invention shown in FIG. 1, the slider 112 has, at its distal end 112b, a sole plate 120 which provides a large contact surface and which is pressed against the plate that is to be drilled.

In the embodiment of the invention shown in FIG. 1, the slider 112 has a suction tube 122 which can be connected to a suction unit in order to remove the waste generated by the drilling.

In the embodiment of the invention shown in FIG. 1, the collar 128 is adjustable in length parallel to the axis of rotation X in order to adjust the moment at which the first spring 130 is compressed, depending on the thickness of the plate that is to be drilled.

In this case, the collar 128 comprises two rings 128a-b that are screwed to one another, and the length of the collar 128 is adjusted by the two rings 128a-b being screwed to one another to a greater or lesser extent. The screwing axis is the axis of rotation X.

It is also possible to replace the collar 128 with a collar of different length, or to replace the springs 130, 132 as required. These modifications make it possible to obtain different travels.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A drilling aid system configured to be mounted on a drill and comprising:
    a body with a first cavity extending between a proximal end and a distal end of the body where the proximal end is configured to be oriented towards the drill,
    a shaft mounted and configured to rotate about an axis of rotation within the first cavity and having a proximal end that is configured to be secured to a chuck of the drill and a distal end to which a drill bit is secured,
    a slider which has a proximal end and a distal end which is configured to press against a plate that is to be drilled, where the proximal end of the slider is mounted so as to be able to slide in translation parallel to the axis of rotation within the first cavity at the distal end of the body, where the slider has a second cavity which extends the first cavity and which extends between the proximal end and the distal end of the slider,
    a collar that directly contacts the shaft and is configured to move in translation parallel to the axis of rotation on the shaft and within the first cavity,
    a first compression spring having a first stiffness and arranged in the first cavity and pressing, at a first end, against the collar and, at a second end, directly against the proximal end of the slider, and
    a second compression spring having a second stiffness greater than the first stiffness, arranged in the first cavity and pressing, at a first end, against the collar and, at a second end, against the proximal end of the body.

2. The drilling aid system according to claim 1, wherein the slider has, at its distal end, a sole plate.

3. The drilling aid system according to claim 1, wherein the collar is adjustable in length parallel to the axis of rotation.

4. A drill comprising a chuck and the drilling aid system according to claim 1, where a proximal end of the shaft is secured to the chuck and where a drill bit is secured to a distal end of the shaft and accommodated in the second cavity.

\* \* \* \* \*